(12) United States Patent
Swartzell et al.

(10) Patent No.: US 11,110,787 B2
(45) Date of Patent: Sep. 7, 2021

(54) STRUCTURAL ENHANCEMENTS OF AN ELECTRIC VEHICLE

(71) Applicant: GM GLOBAL TECHNOLOGY OPERATIONS LLC, Detroit, MI (US)

(72) Inventors: Terry A. Swartzell, Ann Arbor, MI (US); Andre T. Matsumoto, Sterling Heights, MI (US); Bradley Leier, Troy, MI (US); Andrew W. White, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 116 days.

(21) Appl. No.: 16/710,708

(22) Filed: Dec. 11, 2019

(65) Prior Publication Data
US 2021/0178879 A1 Jun. 17, 2021

(51) Int. Cl.
*B60K 1/04* (2019.01)
*B62D 21/15* (2006.01)

(52) U.S. Cl.
CPC ............. *B60K 1/04* (2013.01); *B62D 21/155* (2013.01); *B60K 2001/0438* (2013.01)

(58) Field of Classification Search
CPC ........... B60L 50/64; B60L 50/66; B60K 1/04; H01M 50/20; B62D 21/155
See application file for complete search history.

(56) References Cited

U.S. PATENT DOCUMENTS

| | | | | |
|---|---|---|---|---|
| 8,286,743 B2 * | 10/2012 | Rawlinson | ........... | B62D 29/008 180/68.5 |
| 8,875,828 B2 * | 11/2014 | Rawlinson | ........... | B62D 25/025 180/68.5 |
| 8,985,258 B1 * | 3/2015 | Midoun | ............... | B62D 25/082 180/274 |
| 9,564,663 B2 * | 2/2017 | Kim | ....................... | H01M 50/20 |
| 9,643,660 B2 * | 5/2017 | Vollmer | .................. | B60L 50/60 |
| 10,483,510 B2 * | 11/2019 | Stephens | ............... | H01M 50/20 |
| 2006/0278463 A1 * | 12/2006 | Anzai | ................... | B62D 21/155 180/312 |
| 2014/0338999 A1 * | 11/2014 | Fujii | ..................... | H01M 50/20 180/68.5 |
| 2015/0273996 A1 * | 10/2015 | Onodera | ............... | H01M 50/20 429/100 |

* cited by examiner

*Primary Examiner* — James A Shriver, II
*Assistant Examiner* — James J Triggs
(74) *Attorney, Agent, or Firm* — Cantor Colburn LLP (57) ABSTRACT

An electric vehicle includes a body structure, a forward sub-frame, and a battery pack. The body structure includes first and second side rails. The forward sub-frame includes first and second side supports each having and extending longitudinally between forward and rearward end portions. The first and second side supports are located forward of, and substantially parallel to, the first and second side rails. The battery pack includes a support structure disposed beneath, and engaged to, the body structure between the first and second side rails. The support structure has a plurality of longitudinal components spaced laterally apart from one-another, and disposed parallel to the opposite first and second side rails. The rearward end portions of the first and second side supports are proximate to respective first and second longitudinal components of the plurality of longitudinal components.

20 Claims, 5 Drawing Sheets

STRUCTURAL ENHANCEMENTS OF AN ELECTRIC VEHICLE

INTRODUCTION

The subject disclosure relates to an electric vehicle, and more particularly, to structural enhancements of the electric vehicle.

Vehicles typically include chassis frames and body structures designed to support a multitude of vehicle components and contribute toward vehicle stiffness and strength performance. Examples of frame configurations may include ladder frames, unibody (i.e., semi-monocoque) frames, perimeter frames, and others. Many frames include opposite side rails or rocker panels connected via a multitude of cross members. Projecting forward from the rocker panels may be respective front rails connected via a front cross member, and projecting rearward from the rocker panels may be respective rear rails connected via a rear cross member.

An engine and front suspension may generally be supported by the front rails and proximate cross members. A fuel tank and rear suspension may generally be supported by the rear rails and proximate cross members. The rocker panels and associated cross members may generally support a floor pan, passenger seats, body pillars, and a host of other components and features.

More recently, vehicles may include hybrid vehicles powered via a combination of batteries and a combustion engine. Yet further, all-electric vehicles, or battery electric vehicles (BEV), may operate solely on a battery pack. Such vehicles typically support the weight of the batteries upon the chassis frame and in a variety of locations having sufficient storage space. In order to maintain desired road clearances, the batteries are typically located above the chassis frame. Yet further, the batteries in a single vehicle may require a variety of shapes and sizes in order to utilize available storage space.

Accordingly, improvements in battery storage for BEV's and associated structural frames necessary to support and protect the battery(s) while maintaining and/or meeting other, more traditional, structural requirements is desirable while reducing system costs, simplifying complexity of design and maintenance processes, and improving robustness.

SUMMARY

In one exemplary embodiment of the present disclosure, an electric vehicle includes a body structure, a forward sub-frame, and a battery pack. The body structure includes first and second side rails. The forward sub-frame includes first and second side supports each having and extending longitudinally between forward and rearward end portions. The first and second side supports are located forward of, and substantially parallel to, the first and second side rails. The battery pack includes a support structure disposed beneath, and engaged to, the body structure between the first and second side rails. The support structure has a plurality of longitudinal components spaced laterally apart from one-another, and disposed parallel to the opposite first and second side rails. The rearward end portions of the first and second side supports are proximate to respective first and second longitudinal components of the plurality of longitudinal components.

In addition to the foregoing embodiment, the first side support co-extends along a first centerline, the first longitudinal component co-extends along the first centerline, the second side support co-extends along a second centerline, and the second longitudinal component co-extends along the second centerline.

In the alternative or additionally thereto, in the foregoing embodiment, the plurality of longitudinal components includes a third longitudinal component attached to the first side rail and spaced laterally outward from the first longitudinal component, and a fourth longitudinal component attached to the second side rail and spaced laterally outward from the second longitudinal component.

In the alternative or additionally thereto, in the foregoing embodiment, the forward sub-frame includes a first stanchion extending vertically between and attached to the forward end portion of the first side support and a first forward side rail of the body structure, and a second stanchion extending vertically between and attached to the forward end portion of the second side support and a second forward side rail of the body structure.

In the alternative or additionally thereto, in the foregoing embodiment, the forward sub-frame includes a first stanchion extending vertically between and attached to the forward end portion of the first side support and a first forward side rail of the body structure, and a second stanchion extending vertically between and attached to the forward end portion of the second side support and a second forward side rail of the body structure.

In the alternative or additionally thereto, in the foregoing embodiment, the electric vehicle includes first and second coupling assemblies. The first coupling assembly includes a forward fastener, a first rearward fastener, and a plate in contact with and disposed beneath the rearward end portion of the first side support and the support structure. The forward fastener extends through the plate and the rearward end portion of the first side support, and is secured to the body structure. The first rearward fastener extends through the plate and the support structure, and is secured to the body structure. The second coupling assembly includes a forward fastener, a first rearward fastener, and a plate in contact with and disposed beneath the rearward end portion of the second side support and the support structure. The forward fastener of the second coupling assembly extends through the plate and the rearward end portion of the second side support, and is secured to the body structure. The first rearward fastener of the second coupling assembly extends through the plate and the support structure, and is secured to the body structure.

In the alternative or additionally thereto, in the foregoing embodiment, the forward fastener and the first rearward fastener of the first coupling assembly, and the forward fastener and the first rearward fastener of the second coupling assembly, are bolts adapted to thread into the body structure.

In the alternative or additionally thereto, in the foregoing embodiment, the first and second coupling assemblies each include a second rearward fastener.

In the alternative or additionally thereto, in the foregoing embodiment, the first rearward fasteners of the first and second coupling assemblies extend through a bulkhead of the support structure.

In the alternative or additionally thereto, in the foregoing embodiment, the rearward end portions of the first and second side supports are spaced forward of the bulkhead.

In the alternative or additionally thereto, in the foregoing embodiment, the rearward end portions of the first and second side supports are spaced forward of the support structure.

In the alternative or additionally thereto, in the foregoing embodiment, the plate is adapted to undergo plastic deformation upon a forward impact upon the first and second side supports.

In accordance with another, non-limiting, embodiment, an electric vehicle includes a body structure, a forward sub-frame, a battery pack, a first coupling assembly, and a second coupling assembly. The body structure includes opposite first and second side rails. The forward sub-frame includes opposite first and second side supports each including and extending longitudinally between forward and rearward end portions. The first and second side supports are located forward of, and are substantially parallel to, the first and second side rails. The battery pack includes a support structure disposed beneath, and engaged to, the body structure between the first and second side rails. The support structure has a forward bulkhead longitudinally extending between the first and second side rails. The first coupling assembly includes a forward fastener, a first rearward fastener, and a plate in contact with, and disposed beneath, the rearward end portion of the first side support and the support structure. The forward fastener extends through the plate and the rearward end portion of the first side support, and is secured to the body structure. The first rearward fastener extends through the plate and the support structure, and is secured to the body structure. The second coupling assembly includes a forward fastener, a first rearward fastener, and a plate in contact with, and disposed beneath, the rearward end portion of the second side support and the support structure. The forward fastener extends through the plate and the rearward end portion of the second side support, and is secured to the body structure. The first rearward fastener extends through the plate and the support structure, and is secured to the body structure.

In addition to the foregoing embodiment, the forward fastener and the first rearward fastener of the first coupling assembly and the forward fastener and the first rearward fastener of the second coupling assembly are bolts adapted to thread into the body structure.

In the alternative or additionally thereto, in the foregoing embodiment, the first and second coupling assemblies each include a second rearward fastener.

In the alternative or additionally thereto, in the foregoing embodiment, the first rearward fasteners of the first and second coupling assemblies extend through a bulkhead of the support structure.

In the alternative or additionally thereto, in the foregoing embodiment, the rearward end portions of the first and second side supports are spaced forward of the bulkhead.

In the alternative or additionally thereto, in the foregoing embodiment, the rearward end portions of the first and second side supports are spaced forward of the support structure.

In the alternative or additionally thereto, in the foregoing embodiment, the plate is adapted to undergo plastic deformation upon a forward impact upon the first and second side supports.

In the alternative or additionally thereto, in the foregoing embodiment, the support structure includes first and second elongated components spaced laterally apart from one-another and disposed parallel to the first and second side rails, wherein the rearward end portions of the first and second side supports are proximate to the respective first and second elongated components.

The above features and advantages and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
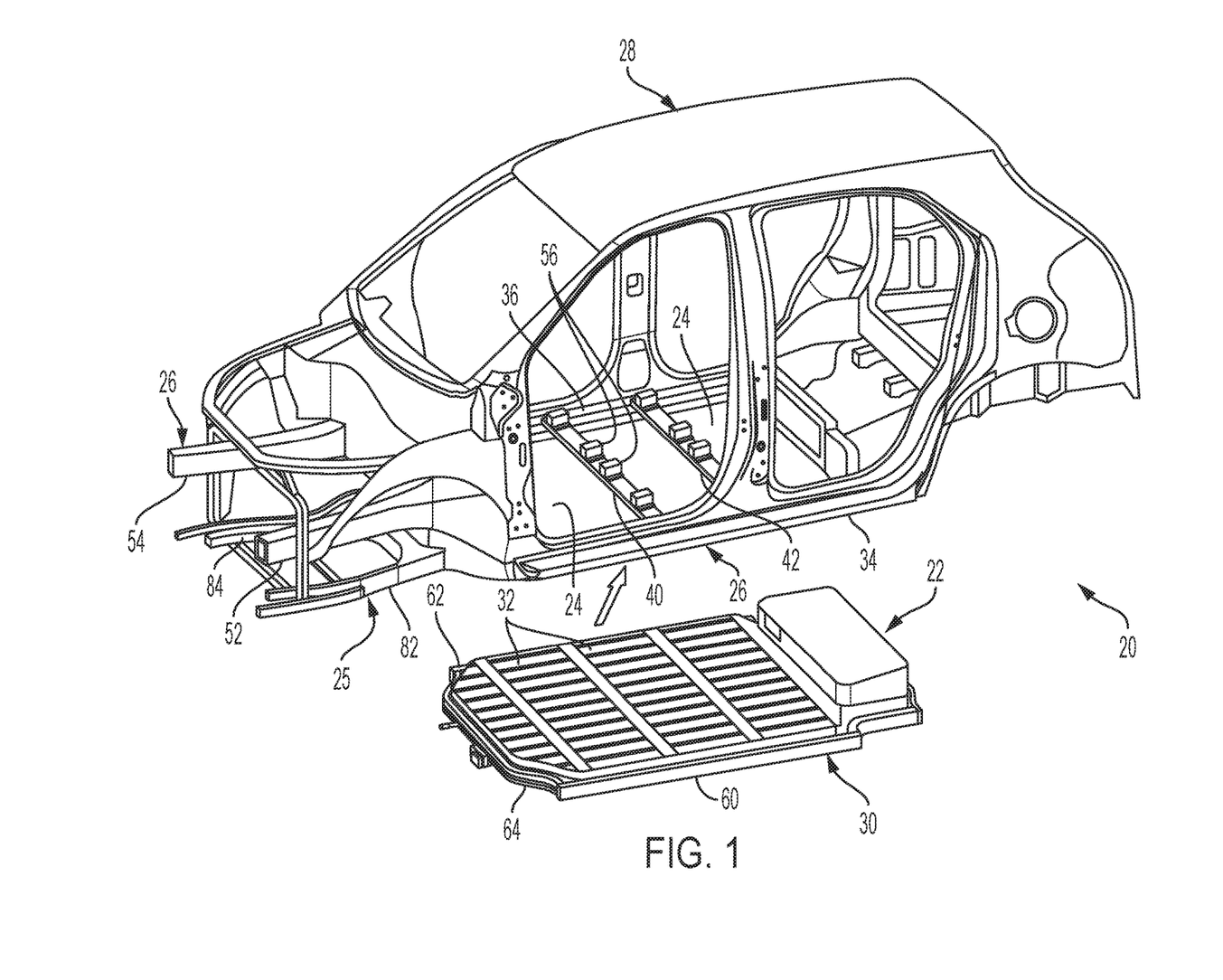
FIG. 1 is a partially disassembled perspective view of an electric vehicle with portions removed to show internal detail, and as one, non-limiting, example in accordance with the present disclosure.

In accordance with an exemplary embodiment, FIG. 1 illustrates a vehicle 20 that may be a hybrid vehicle or a battery electric vehicle (BEV). The vehicle 20 may include an electric storage unit or battery pack 22, a floor pan 24, a forward sub-frame 25, and a body structure 26 that may support, and may generally be unified with, at least a portion of a vehicle body 28. The floor pan 24 may be disposed below, and mounted or engaged to, the body structure 26. The battery pack 22 may include a support structure 30 and a plurality of electric storage modules 32. The support structure 30 may be, at least in-part, disposed beneath the floor pan 24, and is engaged to the body structure 26. For simplification of design and maintenance, and for reduction in cost, each module 32 may be about the same size, or may be identical.

Figure 2:
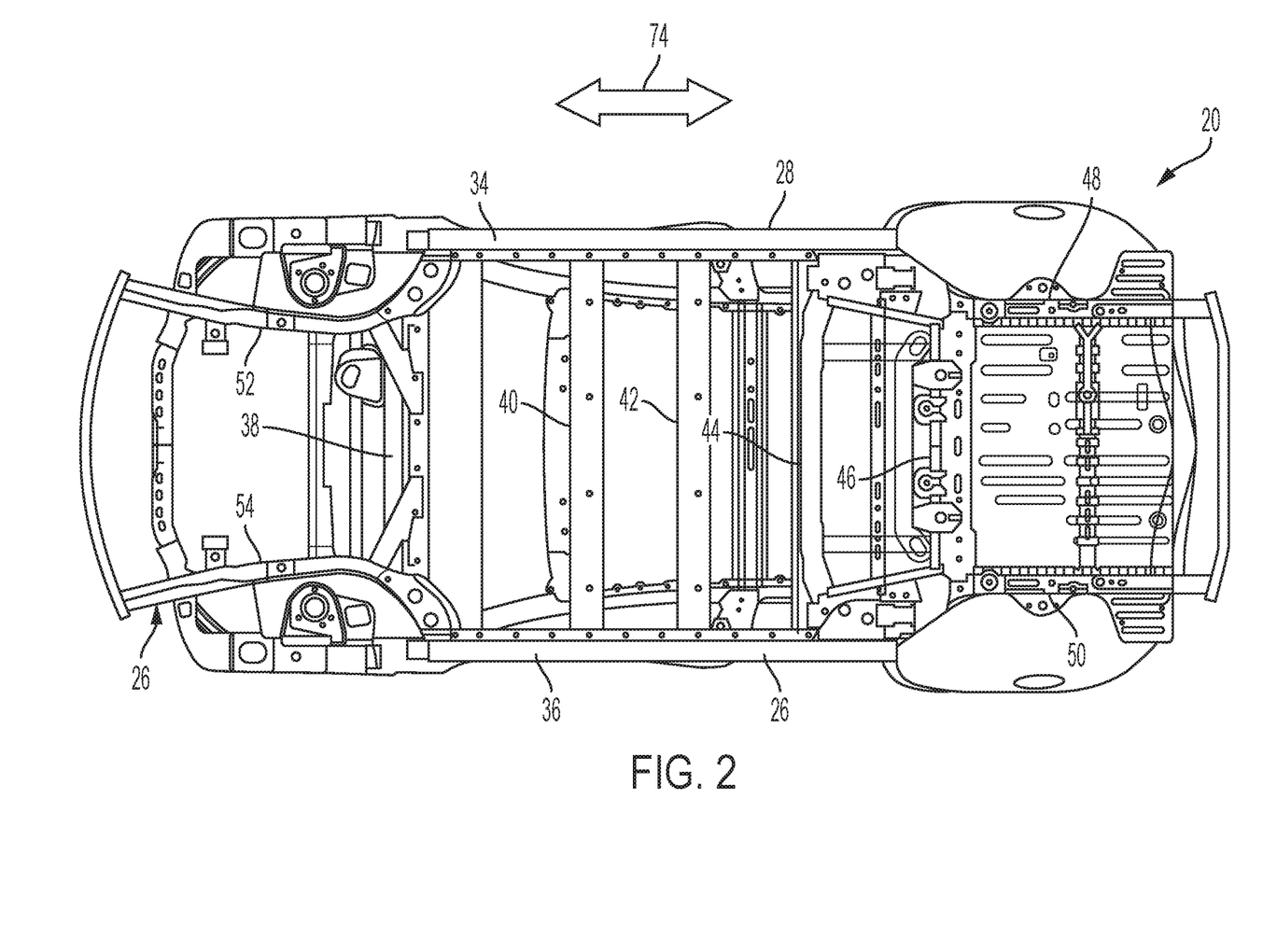
FIG. 2 is a bottom view of the electric vehicle of FIG. 1 with a floor pan, a forward sub-frame, and a battery pack removed to show internal detail.

Referring to FIG. 2, a bottom view of the body structure 26 is illustrated with the battery pack 22 and the forward sub-frame 25 removed to show detail. The body structure 26 may include two opposite side rails 34, 36 (e.g., rocker panels), a plurality of elongated cross members (i.e., five illustrated as 38, 40, 42, 44, 46) laterally spaced apart from one-another, rearward side rails 48, 50, and forward side rails 52, 54. In one example, the cross member 38 spans between and is engaged to the forward side rails 52, 54, and the cross member 46 spans between and is engaged to the rearward side rails 48, 50. The cross members 40, 42, 44 may be seat support cross members, and may span between and are engaged to the side rails 34, 36. The body structure 26 may further include a plurality of seat mounts 56 projecting upward from, and engaged to, at least the cross members 40, 42 (see FIG. 1) for attachment and support of passenger seats (not shown).

Figure 3:
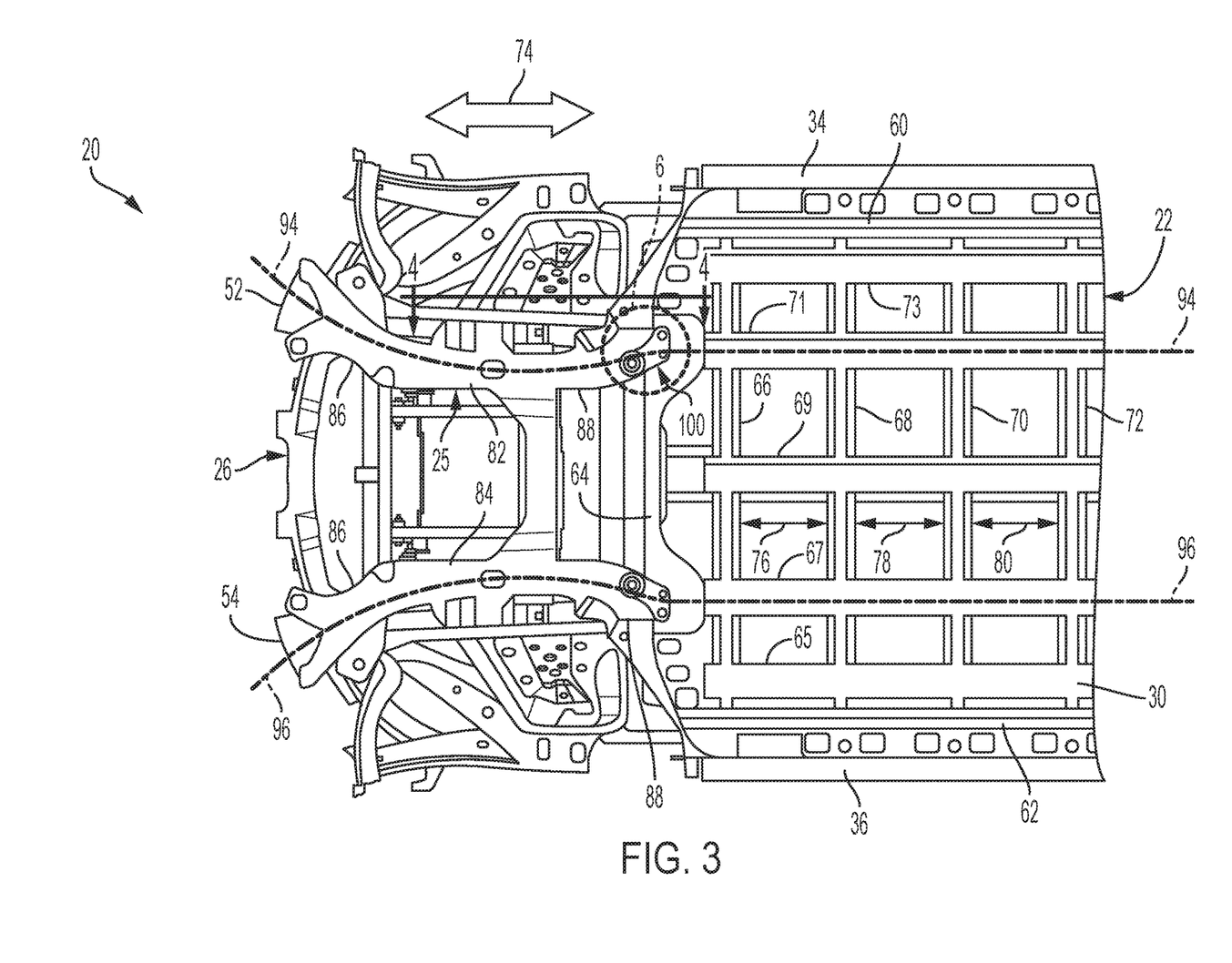
FIG. 3 is a partial bottom view of the electric vehicle of FIG. 1 with the battery pack and the forward sub-frame installed.

Referring to FIG. 3 a partial bottom view of the vehicle 20 is illustrated with the battery pack 22 installed, thus substantially eliminating, or masking-off, details of the body structure 26, illustrated in FIG. 2. The support structure 30 of the battery pack 22 is adapted to protect the electric storage modules 32, and may include a bottom pan 58 (i.e., removed from FIG. 3 to show internal detail, therefore see FIG. 5), a plurality of longitudinal, or length-wise, components (i.e., seven illustrated as 60, 62, 65, 67, 69, 71, and 73), and a plurality of cross components (i.e., five illustrated as 64, 66, 68, 70, 72). Longitudinal components 60, 62 (see FIGS. 1 and 3) are outer, or opposite side, components, and are elongated in a vehicle's longitudinal direction (see arrow 74). Each side component 60, 62 co-extends with, and is attached to, the respective side rails 34, 36 of the body structure 26. The remaining longitudinal components 65, 67, 69, 71, 73 are spaced laterally inward from the side components 60, 62, are spaced laterally away from one-another, and each extends longitudinally along direction 74, such that the longitudinal components 65, 67, 69, 71, 73 are substantially parallel to side components 60, 62 and the side rails 34, 36.

In an embodiment, each side component 60, 62 and each longitudinal component 65, 67, 69, 71, 73 is attached to each one of the cross components 64, 66, 68, 70, 72. Each cross component 64, 66, 68, 70, 72 is substantially perpendicular to the longitudinal components 65, 67, 69, 71, 73, and are laterally spaced from one-another. In an embodiment, the cross component 64 is located forward of the remaining cross components, and may be a bulkhead.

A distance (see arrow 76 in FIG. 3) that is measured in the vehicle longitudinal direction 74 between the cross components 66, 68 may be about equivalent to a distance (see arrow 78) measured between the cross components 68, 70. Similarly, the distance 78 may be substantially equivalent to a distance (see arrow 80) measured between the cross components 70, 72. In one example, each electric storage module 32 may be sized to closely fit between the cross components 66, 68, 70, 72 to achieve optimal packaging. Because the distances 76, 78, 80 are substantially equivalent, each module 32 may be generally equivalent (i.e., at least in size) to facilitate a reduction in manufacturing and maintenance costs through module redundancy.

Figure 4:
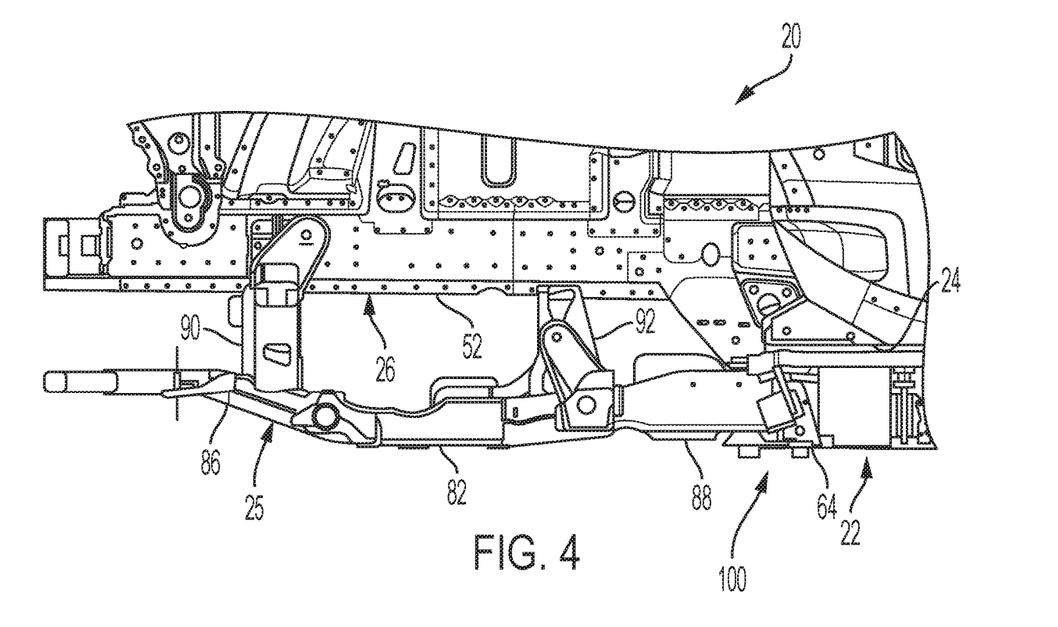
FIG. 4 is a partial side view of the forward sub-frame, a chassis frame, and the battery pack, and viewing in the direction of arrows 4-4 in FIG. 3.
Figure 5:
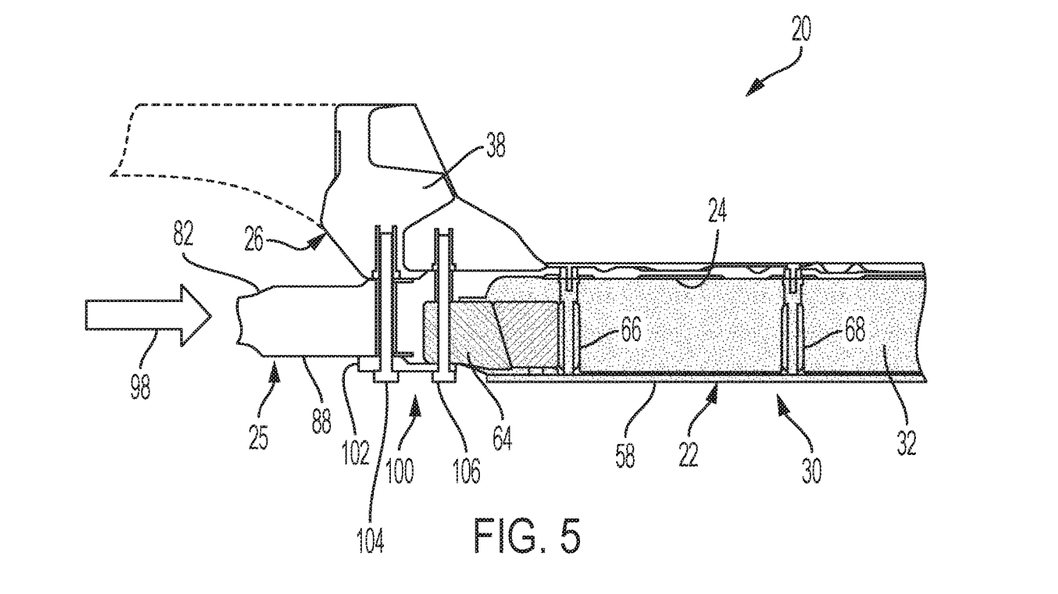
FIG. 5 is partial cross section of the forward sub-frame, the chassis frame, and the battery pack, and is similar in perspective to FIG. 4.

As best shown in FIGS. 4 and 5, partial upright sections of the vehicle 20 are illustrated and depict the battery pack 22 generally disposed beneath the body structure 26 and the floor pan 24. In an embodiment, the bottom pan 58 of the support structure 30 of the battery pack 22 is disposed beneath, and is attached to, the side components 60, 62, the cross components 64, 66, 68, 70, 72, and the longitudinal components 65, 67, 69, 71, 73. In another embodiment, the longitudinal components 65, 67, 69, 71, 73 may be an integral and unitary part of the bottom pan 58. For example, the bottom pan 58 may generally be corrugated, and each longitudinal component 65, 67, 69, 71, 73 is formed by a respective corrugation of the bottom pan 58 (not specifically shown).

Referring to FIGS. 3 through 5, the term "forward sub-frame" is understood to be a term of art known by those skilled in the art of automobiles, and is known to be a discreet, or hidden, part of a vehicle structure designed to protect and carry vehicle components such as an engine and a suspension (not shown). The forward sub-frame 25 is generally located beneath the forward side rails 52, 54 of the body structure 26, and forward of the battery pack 22. The forward sub-frame 25 includes opposite side supports 82, 84. Each side support 82, 84 is generally elongated and is spaced below, and is substantially parallel too, respective forward side rails 52, 54 of the body structure 26.

Each side support 82, 84 includes, and extends between, a forward end portion 86 and a rearward end portion 88 (see FIGS. 3 and 4). Forward stanchions 90 of the forward sub-frame 25 (see FIG. 4) extend substantially vertically, and connect the forward end portions 86 of the respective side supports 82, 84 to the respective forward side rails 52, 54 of the body structure 26. In an embodiment, rearward stanchions 92 of the forward sub-frame 25 (see FIG. 4) extend substantially vertically, and connect the rearward end portions 88 of the respective side supports 82, 84 to the respective forward side rails 52, 54.

Referring again to FIG. 3, the longitudinal component 71 of the battery pack 22 and the side support 82 of the forward sub-frame 25 extend along a common centerline 94. Similarly, the longitudinal component 67 of the battery pack 22 and the side support 84 of the forward sub-frame 25 extend along a common centerline 96. In addition, the rearward portions 88 of the side supports 82, 84 are engaged to the bulkhead 64, and are directly adjacent to the respective longitudinal components 67, 71. With this orientation, any frontal impact loads (see arrow 98 in FIG. 5) may be partially transmitted and dissipated through the side supports 82, 84, the bulkhead 64 and the adjacent longitudinal components 67, 71 for efficient force distribution and protection of the battery pack 22.

Figure 6:
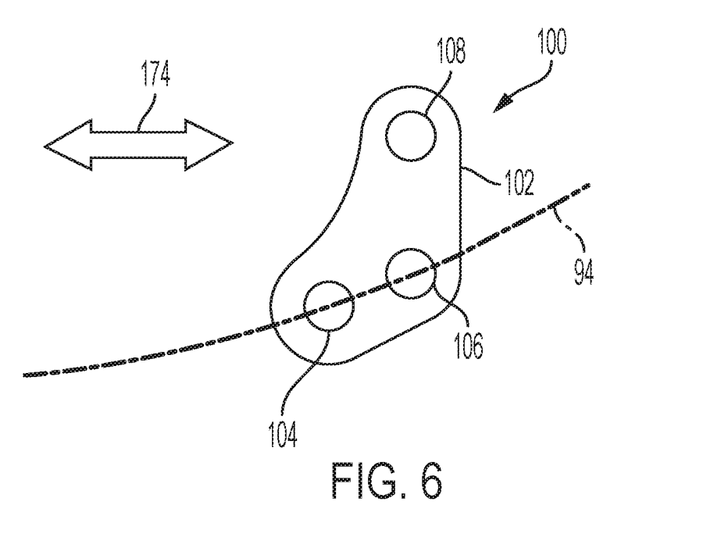
FIG. 6 is a bottom view of a coupling assembly of the electric vehicle taken from circle 6 in FIG. 3.

Referring to FIGS. 3, 5, and 6, the electric vehicle 20 further includes two coupling assemblies 100 adapted to generally connect the rearward end portion 88 of each side support 82, 84 to the body structure 26 and the bulkhead 64 of the support structure 30. The coupling assembly 100 includes a plate 102 (e.g., shear plate), a forward fastener 104, and at least one rearward fastener (i.e. two illustrated in FIG. 6 as 106, 108). In an embodiment, the plate 102 is in contact with and disposed beneath the rearward end portion 88 and the support structure 30 (i.e., bulkhead 64 and in an embodiment, the bottom pan 58). The forward fastener 104 extends through the plate 102 and the rearward end portion 88, and is secured to the cross member 38 of the body structure 26. In an embodiment, the forward fastener 104 is a bolt that threadably engages the cross member 38. The rearward fasteners 106, 108 each extend through the plate 102 and the support structure 30 (e.g., bulkhead 64), and is secured to the cross member 38 of the body structure 26. In an embodiment, the rearward fasteners 106, 108 are bolts that threadably engage the cross member 38.

Referring to FIG. 5, and when fully assembled, the rearward end portion 88 is spaced forward of the bulkhead 64, and the plate 102 is generally the direct linkage between the rearward end portion 88 and the bulkhead 64. During an event of a frontal impact load 98, the plate 102 and the forward fastener 104 are adapted to deform (i.e., plastic deformation) prior to any deformation of the bulkhead 64 of the battery pack 22. In this way, the battery pack 22 is generally protected.

While the disclosure has been described with reference to exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the essential scope thereof. Therefore, it is intended that the disclosure not be limited to the particular embodiments disclosed, but that it will include all embodiments falling within the scope of the application.

What is claimed is:

1. An electric vehicle comprising:
   a body structure including opposite first and second side rails;
   a forward sub-frame including opposite first and second side supports each including and extending longitudinally between forward and rearward end portions, wherein the first and second side supports are located forward of and substantially parallel to the first and second side rails; and
   a battery pack including a support structure disposed beneath and engaged to the body structure between the first and second side rails, the support structure having a plurality of longitudinal components spaced laterally apart from one-another and disposed parallel to the opposite first and second side rails, wherein the rearward end portions of the first and second side supports are proximate to respective first and second longitudinal components of the plurality of longitudinal components.

2. The electric vehicle set forth in claim 1, wherein the first side support co-extends along a first centerline, the first longitudinal component co-extends along the first centerline, the second side support co-extends along a second centerline, and the second longitudinal component co-extends along the second centerline.

3. The electric vehicle set forth in claim 2, wherein the plurality of longitudinal components includes a third longitudinal component attached to the first side rail and spaced laterally outward from the first longitudinal component, and a fourth longitudinal component attached to the second side rail and spaced laterally outward from the second longitudinal component.

4. The electric vehicle set forth in claim 1, wherein the forward sub-frame includes a first stanchion extending vertically between and attached to the forward end portion of the first side support and a first forward side rail of the body structure, and a second stanchion extending vertically between and attached to the forward end portion of the second side support and a second forward side rail of the body structure.

5. The electric vehicle set forth in claim 2, wherein the forward sub-frame includes a first stanchion extending vertically between and attached to the forward end portion of the first side support and a first forward side rail of the body structure, and a second stanchion extending vertically between and attached to the forward end portion of the second side support and a second forward side rail of the body structure.

6. The electric vehicle set forth in claim 1, further comprising:
   a first coupling assembly including a forward fastener, a first rearward fastener, and a plate in contact with and disposed beneath the rearward end portion of the first side support and the support structure, wherein the forward fastener extends through the plate and the rearward end portion of the first side support, and is secured to the body structure, and wherein the first rearward fastener extends through the plate and the support structure, and is secured to the body structure; and
   a second coupling assembly including a forward fastener, a first rearward fastener, and a plate in contact with and disposed beneath the rearward end portion of the second side support and the support structure, wherein the forward fastener extends through the plate and the rearward end portion of the second side support, and is secured to the body structure, and wherein the first rearward fastener extends through the plate and the support structure, and is secured to the body structure.

7. The electric vehicle set forth in claim 6, wherein the forward fastener and the first rearward fastener of the first coupling assembly and the forward fastener and the first rearward fastener of the second coupling assembly are bolts adapted to thread into the body structure.

8. The electric vehicle set forth in claim 6, wherein the first and second coupling assemblies each include a second rearward fastener.

9. The electric vehicle set forth in claim 6, wherein the first rearward fasteners of the first and second coupling assemblies extend through a bulkhead of the support structure.

10. The electric vehicle set forth in claim 9, wherein the rearward end portions of the first and second side supports are spaced forward of the bulkhead.

11. The electric vehicle set forth in claim 6, wherein the rearward end portions of the first and second side supports are spaced forward of the support structure.

12. The electric vehicle set forth in claim 11, wherein the plate is adapted to undergo plastic deformation upon a forward impact upon the first and second side supports.

13. An electric vehicle comprising:
    a body structure including opposite first and second side rails;
    a forward sub-frame including opposite first and second side supports each including and extending longitudinally between forward and rearward end portions, wherein the first and second side supports are located forward of and substantially parallel to the first and second side rails;
    a battery pack including a support structure disposed beneath and engaged to the body structure between the first and second side rails, the support structure having a forward bulkhead longitudinally extending between the first and second side rails;
    a first coupling assembly including a forward fastener, a first rearward fastener, and a plate in contact with and disposed beneath the rearward end portion of the first side support and the support structure, wherein the forward fastener extends through the plate and the rearward end portion of the first side support, and is secured to the body structure, and wherein the first rearward fastener extends through the plate and the support structure, and is secured to the body structure; and
    a second coupling assembly including a forward fastener, a first rearward fastener, and a plate in contact with and disposed beneath the rearward end portion of the second side support and the support structure, wherein the forward fastener extends through the plate and the rearward end portion of the second side support, and is secured to the body structure, and wherein the first rearward fastener extends through the plate and the support structure, and is secured to the body structure.

14. The electric vehicle set forth in claim 13, wherein the forward fastener and the first rearward fastener of the first coupling assembly and the forward fastener and the first rearward fastener of the second coupling assembly are bolts adapted to thread into the body structure.

15. The electric vehicle set forth in claim 13, wherein the first and second coupling assemblies each include a second rearward fastener.

16. The electric vehicle set forth in claim 13, wherein the first rearward fasteners of the first and second coupling assemblies extend through a bulkhead of the support structure.

17. The electric vehicle set forth in claim 16, wherein the rearward end portions of the first and second side supports are spaced forward of the bulkhead.

18. The electric vehicle set forth in claim 13, wherein the rearward end portions of the first and second side supports are spaced forward of the support structure.

19. The electric vehicle set forth in claim 18, wherein the plate is adapted to undergo plastic deformation upon a forward impact upon the first and second side supports.

20. The electric vehicle set forth in claim 13, wherein the support structure includes first and second elongated components spaced laterally apart from one-another and disposed parallel to the first and second side rails, wherein the rearward end portions of the first and second side supports are proximate to the respective first and second elongated components.

* * * * *